United States Patent Office 3,275,093
Patented Sept. 27, 1966

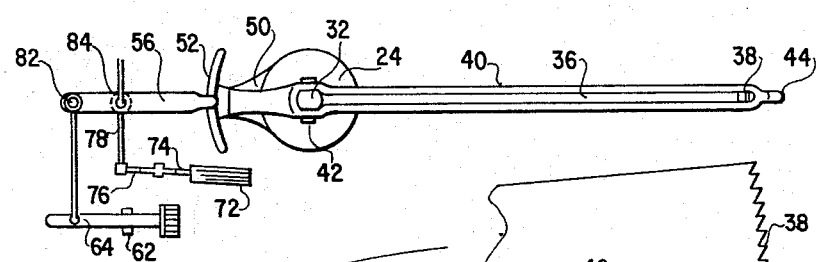

3,275,093
HAND COMBINED VEHICLE STEERING, POWER, AND BRAKING CONTROL HANDLE
Walter S. Pawl, 2844 Powder Mill Road, Adelphi, Md.
Filed Sept. 4, 1964, Ser. No. 394,577
12 Claims. (Cl. 180—77)

The present invention relates to simplified safety type of controls for motor driven vehicles operable by one hand.

The main object of this invention is to make driving of motor vehicles safer and easier by placing all the controls on one hand lever, which automatically assumes a normal brakes-on position whenever the lever is released.

Another object is to simplify driving automatic transmission vehicles, by eliminating the brake and power control foot pedals and the steering wheel, and mounting a simple steering lever in a vertical steering post within reach of the driver, and an operating handle with a control lever interlocked with said hand lever for steering operation, said control lever being movable relatively to said hand lever for simultaneously controlling a power brake system in one range of movement and the power control in another range, the brakes-released position of the power brake range being adjacent the idling position of the power control range of said movement, this movement being normally biased toward the brakes-on end of the range when the operating handle is released from the operator's grip.

A further object is to supplement the existing power and brake control foot pedals and replace the existing steering wheel by the above simple steering lever combination, suitable linking its control lever to the existing power brake controls, whereby either the foot pedals or the control lever may be selectively used with the hand lever for steering.

Other and more specific objects will become apparent in the following detailed description of an illustrative form of the present invention, as disclosed in the accompanying drawing, wherein FIG. 1 is a side elevational view partly in section of the illustrative form of the invention, FIG. 2 is a plan view thereof, and FIG. 3 is an enlarged detail view of the control handle and the end of the hand lever for steering, with which it cooperates in controlling the brakes and the power simultaneously with the steering operation.

The steering post 10 is mounted on the floor board 12 and may be located preferably centrally of the front seat 14 in the vehicle 16 partially outlined in phantom in FIG. 1. The steering shaft 18 is rotatably mounted in the steering post 10 and may be provided with a ball bearing 20 between a flange 22 on the steering post and flange 24 on the shaft 18. Shaft 18 has a steering arm 26 connected by a ball and socket joint 28 to the power steering linkage 30.

A stud shaft 32 on top of flanged portion 24 of shaft 18 provides a bearing 34 and has a hand lever 36 extending rearwardly therefrom and from the top of flange 24 to a point within easy reach of the driver in the seat 14. This hand lever is flat in the vertical plane and is no thicker than the length of bearing 34 in stud shaft 32. The edge at the outer end of hand lever 36 is arcuately formed about the axis of bearing 34 and is provided with ratchet teeth 38.

A control lever 40 straddles the stud shaft and hand lever 36 and is pivoted on a cross pin 42 in said stud shaft. It has a handle provided with a grip 44 and a spring biased pawl 46 which is normally biased to released position, but may be pressed to engage the ratchet teeth in any position of the control lever 40 in the power range by means of a trigger cam 48, so as to hold the control lever in said position against the normal downward bias on the control lever as long as a light finger pressure is maintained on the trigger cam to hold the pawl 46 in engagement with the ratchet teeth 38. Thus the driver's hand is relieved from the strain of continuous operation at any one power setting in holding the control lever up against said normal downward bias, yet upon release of the finger pressure on the trigger cam, as would happen in any emergency, the power control would immediately be returned to idling and the control lever would drop into the brake range automatically. This is an important safety feature of this control arrangement, because the simple automatic response to any emergency is instantaneous, requiring no positive action on the part of the driver to stop within the minimum distance possible, even if the driver panics or suddenly loses consciousness or falls asleep. Many serious accidents including deaths could have been avoided if the stopping distance had been reduced to lessen or even avoid the impact, because it is only the last and often only a short part of this distance that causes the impact.

Control lever 40 has a short arm 50 extending forwardly from the bearing 34 and ending in an arcuate portion 52 extending in a horizontal plane and being adapted to operate slidably in the horizontal slot in the lug 54 on cantilever arm 56 extending from a keyed collar 58 which is slidably supported on the steering post and is normally biased upwardly by a strong coil spring 60.

The outer end of the arm 56 may be adapted to be connected by suitable lost motion linkage to the existing power brake controls and the power control as shown in the drawing where a typical arrangement of pedals and linkage is illustrated. In this case, the brake pedal is mounted at 62 and has an arm 64 which is connected through the rod 70 to the power brake linkage under the hood. The power control pedal 72 is mounted on the floor board and is connected through the rod 74, bell crank 76 and rod 78 to the throttle valve linkage 80.

Thus the cantilever arm 56 may be connected with lost motion connections at 82 and 84 to operate from its uppermost position when the control lever 40 was in its lowermost "breaks on" position (B ON) to the "breaks off-idling" (B OFF IDLING) position shown in FIG. 1 so as to release the brakes and as the arm 56 is moved further downwardly after taking up the lost motion at 84, to then begin opening the throttle when the arm 56 engages the stop nut 86 on the rod 78 while it slides freely over the rod 88 connected to the brake arm 64, after disengaging the head of this rod at the connection 82.

Obviously, the brake and power control pedals could be removed, if desired, especially in new vehicle models, where direct connections can be simplified, and the floor board cleared of the superfluous controls.

If the pedals are retained for selective control of the brakes and/or power control, a slide stop 90 may be provided for stopping the control handle 40 from dropping into the brake control range when using the brake and/or the power control pedals.

The pawl 46 has a hook end which is used by depressing the trigger 48 to stop the control lever 40 at the idling position when it is desired to release the brakes without going into the power control range, as for coasting or towing operations.

It will be seen that in its broadest sense the invention comprises a steering post mounted near the seat in the driver's compartment of the vehicle, and a steering shaft rotatably mounted therein and having an operating lever horizontally hinged at the top of said shaft and extending within easy reach of the driver in the seat for steering operation through rotation of the steering shaft and for up and down operation through adjacent ranges of motion for power and brake control movements in opposite directions from a common idling power and brakes-off position.

This arrangement of controls provides a simple single control lever which permits quicker response in emergencies, because no time is wasted in shifting from one control to another in operating the three principal controls in the modern automotive vehicle: the steering, the power and the brakes. There are, at present, control systems in which the power and brake controls are operated by the same foot pedal, such as disclosed e.g. in Hemphill Pat. No. 2,871,999 issued October 25, 1960, but the present invention further unifies all three controls, eliminating the separate steering wheel, thus ridding the driver's compartment of a cumbersome obstruction, while improving the safety and comfort of the driving operation.

Obviously, there are many other ways of adapting the control linkages from this single lever to the power and brake controls than that which is illustrated in the drawings. Especially in new installation designs where no pedal controls are retained, the shaft 18 may be made hollow so that the linkage to the power and brake controls might include a rod passing completely through this shaft, the shaft 40 being hinged to an extension of the flange 24 to a hinge at 54 to move the rod which would be suspended from it at 42. A coil spring could then be mounted in the hollow shaft freely around the rod to provide the downward bias on the control lever 40.

Many other obvious modifications in the details and arrangement of parts may be made without departing from the spirit and scope of the present invention as defined in the appended claims.

What is claimed is:

1. A unitary hand control system for automotive vehicles which have a power control linkage, a brake control linkage, a steering control linkage, and a front seat compartment for the driver, comprising:
 a steering post in said compartment near said front seat,
 a steering shaft rotatably mounted in said post, having a steering control lever extending rearwardly from its top to a point convenient for the driver,
 said control lever being pivoted on said steering shaft to swing vertically and having an arm extending forwardly from its pivot, and a lost motion connection between the end of said arm and the power and brake control linkages to affect their controls in adjacent ranges of the swing of said control lever, the full power and brakes-on positions being at opposite ends of said ranges.

2. A unitary hand control system as defined in claim 1, the control lever being normally biased toward the brakes-on position, and
 a grip handle on the rear end of said control lever.

3. A unitary hand control system as defined in claim 2, a ratchet on a support plate extending from the top of the post to said grip handle,
 a normally released pawl mounted on said handle for cooperation with said ratchet and
 a finger control means for operating said pawl to release said lever from any power adjustment position to any other desired position for extended periods during steady driving without straining against said normal bias.

4. A simple lever control system for automotive vehicles comprising
 a steering post
 a steering shaft rotatably mounted therein and adapted for connection to the steering linkage of the vehicle, and
 a control lever hinged to the upper end of said steering shaft adapted to turn said shaft for steering operation and having an up and down motion on its hinge for power and brake control operations within adjacent ranges of movement in opposite directions from a common idling power and brakes-off position,
 said control lever having an arm extending from its hinge, and
 suitable lost motion connections between said arm and said power and break controls to operate said controls selectively from said common position of said lever.

5. A control system as defined in claim 4, said control lever being adapted for operating existing power and brake control linkages in a vehicle by means of said lost motion connections to these respective controls so that the motion transmitted from the lever in either direction from said common position will be effective to operate only the corresponding control while having an ineffective lost motion connection with respect to the operation of the other control, whereby said control lever and the existing controls on the vehicle may be operated selectively to control the power and the brakes, as may be desired by a single hand operation.

6. A control system as defined in claim 4, said control lever having normal bias means toward the brakes-on end of the brake control range.

7. A control system as defined in claim 6, said control lever having a suitable grip handle within easy access to either of two drivers sitting side by side in a vehicle.

8. A control system as defined in claim 7, and a support arm extending from the upper end of said steering shaft and having an arcuate edge adjacent the forward part of said grip handle with ratchet teeth on said arcuate edge, a pawl pivoted on said forward part of the grip handle for cooperation with said ratchet teeth to hold said control arm against the normal bias thereon in any power control position within the power range, when the pawl if pressed against said edge.

9. A control system as defined in claim 8, said pawl being normally biased out of engagement of said teeth, and a finger operated trigger cam on said grip handle for pressing said pawl against said teeth.

10. A control system as defined in claim 9, said control lever being slotted vertically from the forward part of the grip handle to the steering shaft to straddle said support arm.

11. A control system as defined in claim 10, said pawl having a hooked end for hooking under the end of said arcuate edge when said trigger cam is operated, so as to stop the control lever from entering the power range upon releasing the brakes when coasting or being towed with the engine running.

12. A control system as defined in claim 10, and a normally retractible slide stop for said control lever against entering the brake control range, when so desired.

References Cited by the Examiner

UNITED STATES PATENTS

| | | | |
|---|---|---|---|
| 616,153 | 12/1898 | Sperry | 180—59 |
| 767,529 | 8/1904 | Robinson | 180—25 |

FOREIGN PATENTS

| | | |
|---|---|---|
| 16,716 | 4/1897 | Great Britain. |

A. HARRY LEVY, *Primary Examiner.*